(12) United States Patent
Pulice et al.

(10) Patent No.: US 7,544,290 B2
(45) Date of Patent: Jun. 9, 2009

(54) AQUARIUM

(75) Inventors: Diana Lynn Pulice, Boca Raton, FL (US); Jeff Cameron Wright, Deerfield Beach, FL (US)

(73) Assignee: Reading Etc., Inc., Deerfield Beach, FL (US)

( * ) Notice: Subject to any disclaimer, the term of this patent is extended or adjusted under 35 U.S.C. 154(b) by 280 days.

(21) Appl. No.: 11/410,183

(22) Filed: Apr. 24, 2006

(65) Prior Publication Data

US 2007/0246413 A1 Oct. 25, 2007

(51) Int. Cl.
*A01K 63/04* (2006.01)

(52) U.S. Cl. .............. 210/167.21; 210/167.26; 210/175; 210/416.2; 119/259; 119/261; 119/262; 119/269

(58) Field of Classification Search ............. 210/167.21, 210/167.26, 175, 220, 416.1, 416.2; 119/259–262, 119/269
See application file for complete search history.

(56) References Cited

U.S. PATENT DOCUMENTS

| | | | |
|---|---|---|---|
| 1,956,524 A * | 4/1934 | Byram | 137/590.5 |
| 2,931,895 A * | 4/1960 | Wagenhauser | 362/267 |
| 3,687,291 A * | 8/1972 | Willinger | 210/167.23 |
| 4,156,401 A * | 5/1979 | Ogui | 119/259 |
| 4,196,695 A | 4/1980 | Zupo | |
| 4,236,488 A * | 12/1980 | Olds et al. | 119/262 |
| 4,318,945 A | 3/1982 | Goldman et al. | |
| D265,856 S | 8/1982 | Totten | |
| 4,385,088 A | 5/1983 | Baskin | |
| D270,936 S | 10/1983 | Everson | |
| 4,717,036 A * | 1/1988 | Dundas et al. | 220/484 |
| 4,788,938 A | 12/1988 | Davenport | |
| 4,820,566 A | 4/1989 | Heine et al. | |
| 4,957,623 A * | 9/1990 | Henzlik | 210/167.23 |
| 4,958,593 A | 9/1990 | Hurlburt et al. | |
| 5,416,676 A | 5/1995 | Carpenter | |

(Continued)

OTHER PUBLICATIONS

David A. Lass., Aquarium Fish.com. Article: Aquarium Fish Magazine, pp. 1-5 (May 9, 2006).

(Continued)

*Primary Examiner*—Fred Prince
(74) *Attorney, Agent, or Firm*—William D. Schmidt, Esq.; Kalow & Springut LLP

(57) ABSTRACT

An aquarium is provided that hides ugly electrical wires. The aquarium comprises: a tank capable of holding water, the tank having an interior and an exterior, and a bottom, the bottom having an opening within the interior of the tank, a hollow member disposed within at least the interior of the tank and having an upper opening, a lower opening, an inner surface and an outer surface, the lower opening capable of aligning around or with the opening in the bottom of the tank so that water is prevented from leaking out the opening in the bottom of the tank, the outer surface of the hollow member capable of preventing water flow into the inner surface of the hollow member, and the inner surface of the hollow member capable of receiving one or more electrical wires to or from the upper and lower openings of the hollow member. In various embodiments, a decorative structure is provided that can hide and protect electrical devices typically used in the aquarium. In other embodiments, the tank has a top base that conceals an aquarium light.

19 Claims, 9 Drawing Sheets

U.S. PATENT DOCUMENTS

| | | | |
|---|---|---|---|
| 5,438,959 | A | 8/1995 | Stone |
| D420,423 | S | 2/2000 | Blount |
| 6,041,740 | A | 3/2000 | Newman |
| 6,149,991 | A | 11/2000 | Okuda |
| 6,309,714 | B1 | 10/2001 | Gaither |
| 6,684,813 | B1 * | 2/2004 | Lemon .................... 119/69.5 |
| 6,949,185 | B2 | 9/2005 | Woodard et al. |
| 2006/0000755 | A1 * | 1/2006 | Carley et al. ............... 210/169 |

OTHER PUBLICATIONS

PopUp Aquarium & Ponds, Water Garden Fountains, Brochure disclosing hiding pumps within decorative rocks Oasis, "Outdoor Seasons" pp. 28-31 (May 9, 2006).

Systimax ® Solutions, Systimax ® Indoor/Outdoor Stranded Loose Tube Plenum-Rated Dielectric Cable., pp. 1-5 (2004).

Reading ETC, Website Visited Products (May 16, 2006).

Ocean Treasures Collection® Assembly & Instruction Manual Package Insert (Dec. 2005).

* cited by examiner

AQUARIUM

BACKGROUND

Aquariums are found in virtually every household. Ranking as one of America's largest hobby, keeping fish has outranked such popular pastimes as gardening or stamp collecting.

A wide variety of aquarium decor is available to enhance the beauty and enjoyment of an aquarium. This decor varies from artificial or live plants, to rocks or ornaments that are displayed in the tank.

Many aquariums also have accessories used to maintain a healthy environment for aquatic life. Examples of accessories for aquariums include, lighting fixtures, filters, aerators, heaters, automatic feeders, etc. These accessories are important in maintaining proper lighting, temperature regulation, water circulation and filtration.

Unfortunately, many aquarium accessories utilize power cords that simply dangle on the outside the aquarium and are clearly visible, which detracts from the natural and aesthetic beauty of the aquarium.

Some aquariums are designed to have the accessory so close to the fish that the fish can easily move the accessory causing it malfunction eventually ruining the aesthetic beauty of the aquarium. For example, many aquarium filters have water uptake tubes that make an easy target for the fish or other animals to bang into it and dislodge the uptake tube causing the filter to malfunction, eventually destroying the healthy environment and the aesthetic beauty of the aquarium.

Based on the above, there is a need for new aquariums and aquarium assemblies that improve the aesthetic quality of an aquarium while still maintaining, or even enhancing the effectiveness of accessories associated with the environmental quality of the aquarium.

SUMMARY

An aquarium is provided having improved aesthetic quality that still maintains, or even enhances the effectiveness of accessories associated with the environmental quality of the aquarium.

The aquarium comprises a hollow member that runs to or through the bottom of the tank and allows those ugly electrical wires to run inside the hollow member so that they are hidden in the interior of that tank. In various embodiments, a decorative structure is provided around the hollow member that allows electrical devices to be hidden behind it, so that not only is the aesthetic beauty of the tank maintained, but also the electrical devices are protected from the fish.

In various embodiments, an aquarium light and electrical wire are also hidden from view by placing a top base over the light, which further adds to the aesthetic beauty of the tank.

In one embodiment, an aquarium is provided, comprising: a tank capable of holding water, the tank having an interior and an exterior, and a bottom, the bottom having an opening within the interior of the tank, a hollow member disposed within at least the interior of the tank and having an upper opening, a lower opening, an inner surface and an outer surface, the lower opening capable of aligning around or with the opening in the bottom of the tank so that water is prevented from leaking out the opening in the bottom of the tank, the outer surface of the hollow member capable of preventing water flow into the inner surface of the hollow member, and the inner surface of the hollow member capable of receiving one or more electrical wires to or from the upper and lower openings of the hollow member.

In another embodiment, an aquarium is provided, comprising: a tank capable of holding water, the tank having an interior and an exterior, and a bottom, the bottom having an opening within the interior of the tank, a hollow member disposed within at least the interior of the tank and having an upper opening above the water level of the tank, a lower opening, an inner surface and an outer surface, the lower opening capable of aligning with the opening in the bottom of the tank so that water is prevented from leaking out the opening in the bottom of the tank, the outer surface of the hollow member capable of preventing water flow into the inner surface of the hollow member, and the inner surface of the hollow member capable of receiving one or more electrical wires to or from the upper and lower openings of the hollow member.

In an exemplary embodiment, a method of making an aquarium is provided, comprising: making an opening in a bottom of the aquarium, positioning a hollow member through the opening or bonding the hollow member to the opening at the bottom of the tank so as to provide a water tight seal preventing water from leaking out the opening, wherein the hollow member is capable of receiving electrical wires to and from an electrical device.

Additional features and advantages of various embodiments will be set forth in part in the description that follows, and in part will be apparent from the description, or may be learned by practice of various embodiments. The objectives and other advantages of various embodiments will be realized and attained by means of the elements and combinations particularly pointed out in the description and appended claims.

It is to be understood that the figures are not drawn to scale. Further, the relation between objects in a figure may not be to scale, and may in fact have a reverse relationship as to size. The figures are intended to bring understanding and clarity to the structure of each object shown, and thus, some features may be exaggerated in order to illustrate a specific feature of a structure.

DETAILED DESCRIPTION

Reference will now be made in detail to certain embodiments of the invention, examples of which are illustrated in the accompanying drawings. While the invention will be described in conjunction with the illustrated embodiments, it will be understood that they are not intended to limit the invention to those embodiments. On the contrary, the invention is intended to cover all alternatives, modifications, and equivalents, which may be included within the invention as defined by the appended claims.

The aquarium of the present invention can be used as a water-dwelling for plants and animals (e.g., fish, invertebrates, amphibians, marine mammals, and/or reptiles) and makes an attractive environment to keep such animals.

Figure 1:
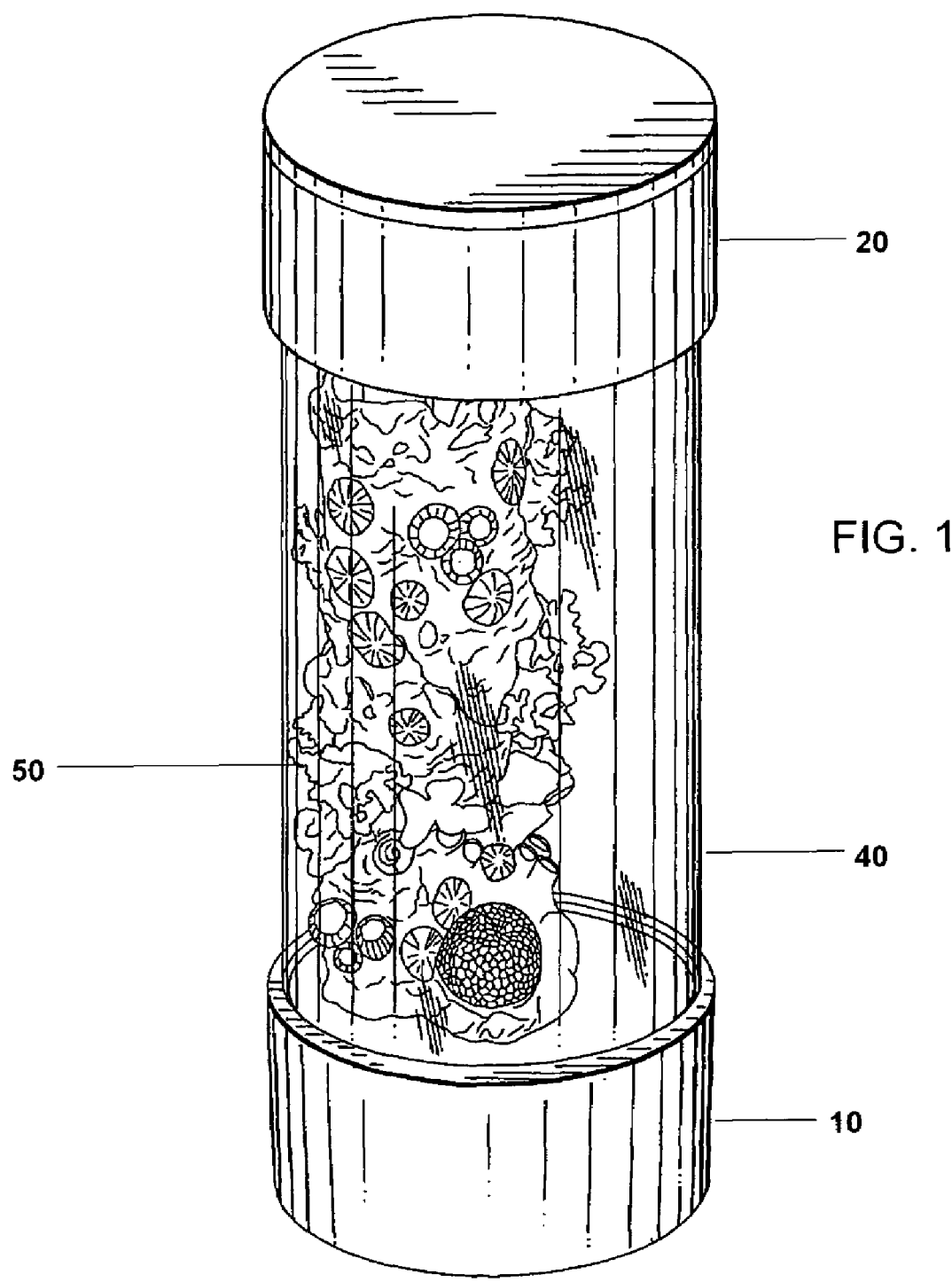
FIG. 1 illustrates a side view of one embodiment of an assembled aquarium showing top and bottom bases and a decorative coral. Hidden from view are the light outlet, other electrical device, electrical wires and hollow member.

FIG. 1 illustrates a side view of one embodiment of the assembled aquarium showing top (20) and bottom (10) bases, tank (40) and a decorative coral (50). The light outlet is hidden from view by top base (20), which slips or snaps over the top of the aquarium. Top base (20) also runs over a portion of the exterior of the tank to hide the upper opening of the hollow member and further hide electrical wires running within the hollow member. The coral (50) hides the electrical wires (from, e.g., a filter, heater, aerator, light, or automatic feeder, etc.) inside the tank and allows the electrical wires to come out the bottom of base (10).

Figure 2:
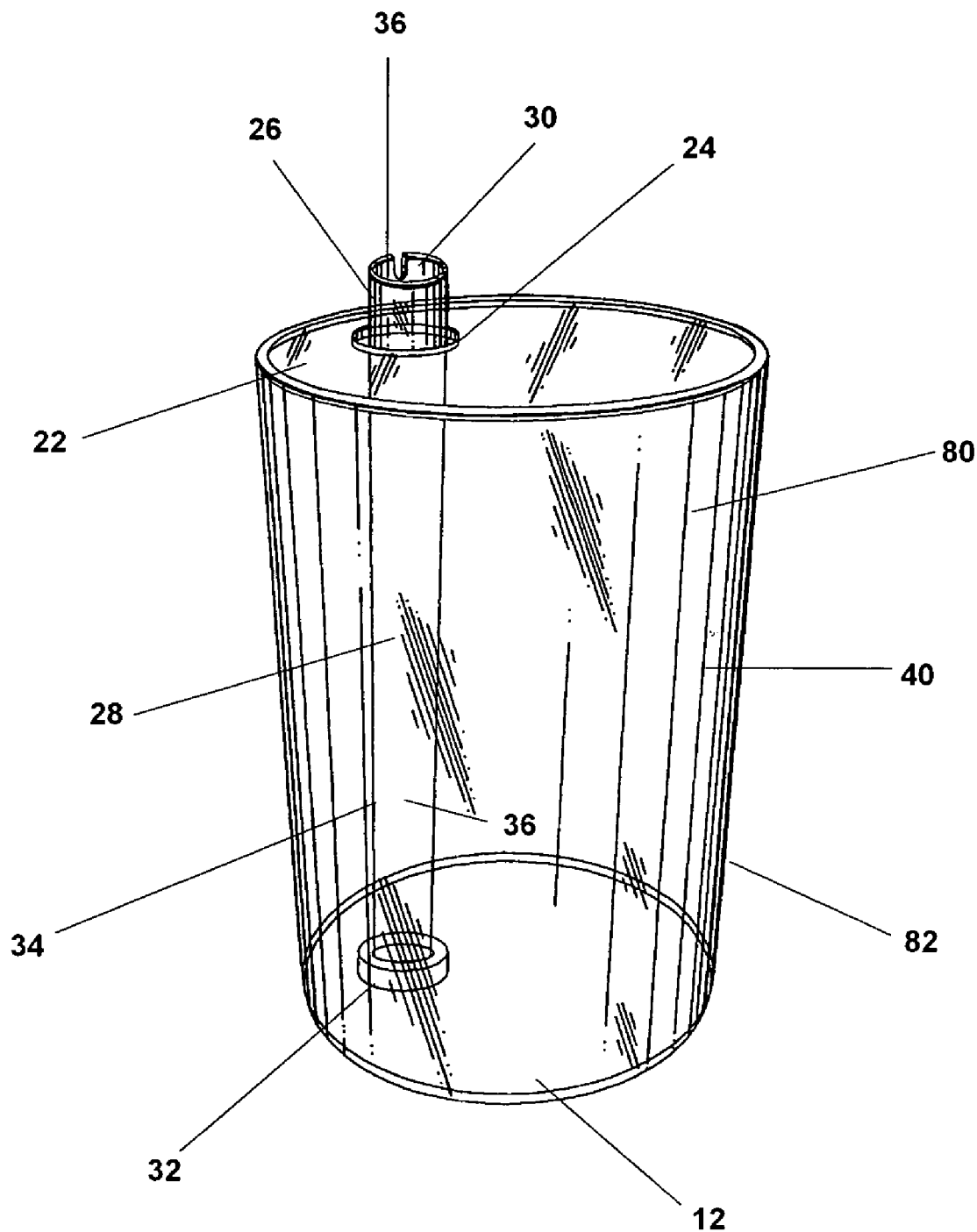
FIG. 2 illustrates a side view of one embodiment of the aquarium tank without the top base, bottom base, coral or light fixture. The aquarium tank comprises a hollow member within the interior of the tank that aligns with an opening in the bottom interior of the tank and aligns with an opening in the top of the tank. Electrical wires from an electrical device can run through the hollow member out the bottom of the tank and out to an electrical outlet.

Referring to FIG. 2, in various embodiments, an aquarium is provided, comprising: a tank (40) capable of holding water, the tank having an interior (80) and an exterior (82), and a bottom (12), the bottom of the tank having an opening (38, shown in FIG. 3) within the interior of the tank, a hollow member (28) disposed within at least the interior (80) of the tank and having an upper opening (30), a lower opening, an inner surface (36) and an outer surface (34), the lower opening capable of aligning around or with the opening in the bottom of the tank (38, shown in FIG. 3) so that water is prevented from leaking out the opening in the bottom of the tank, the outer surface (34) of the hollow member capable of preventing water flow into the inner surface (36) of the hollow member, and the inner surface of the hollow member capable of receiving one or more electrical wires to or from the upper (30) and lower openings of the hollow member.

FIG. 2 also shows the top cover of the tank (22) in the closed position. The top cover optionally may have a rim or edge that fits snuggly to cover the tank. The hollow member (28) may have an upper portion (26) that is capable of receiving a light or a light socket that can be attached, wherein the electrical wires will run up or down the inner surface (36) of the hollow member and out the lower opening of the hollow member and out the bottom opening of tank bottom (38, shown in FIG. 3). In this way, the electrical wires can be hidden within the hollow member (28), if the hollow member is opaque.

The hollow member core allows electrical wires to run up and/or down the hollow member. A hollow member includes, a pipe, tube, channel, column, cylinder, or the like. The hollow member can be any size, shape and color, or transparent. In various embodiments, the lower opening of the hollow member may be flush with bottom opening of the tank. In various embodiments, the upper opening of the hollow member may be flush with the top cover or top of the tank.

In various embodiments, the hollow member may have a design thereon (e.g., coral, floral, one or more colors, etc.) that gives aesthetic value to the tank. The hollow member (28) runs within the interior of the tank, adjacent to the walls of the tank and can comprise a flange (32) that contacts the lower opening of the hollow member and the opening in the bottom of the tank (38, shown in FIG. 3) to prevent water from leaking out the opening in the bottom of the tank. The flange can be bonded to the bottom of the tank and can be bonded to the hollow member. The flange can act as a water-resistant seal or be sealed with waterproof material (e.g., silicone, glue, caulk, etc.) to prevent water from leaking out of the tank. In various embodiments, the hollow member (28) passes through the opening to coapt (fill in) or fit snuggly in the opening in the bottom of the tank (38, shown in FIG. 3) to prevent water from leaking out the opening in the bottom of the tank. In various embodiments, the bottom opening of the tank can be sealed with a water-resistant seal to also prevent leaks.

Figure 3:
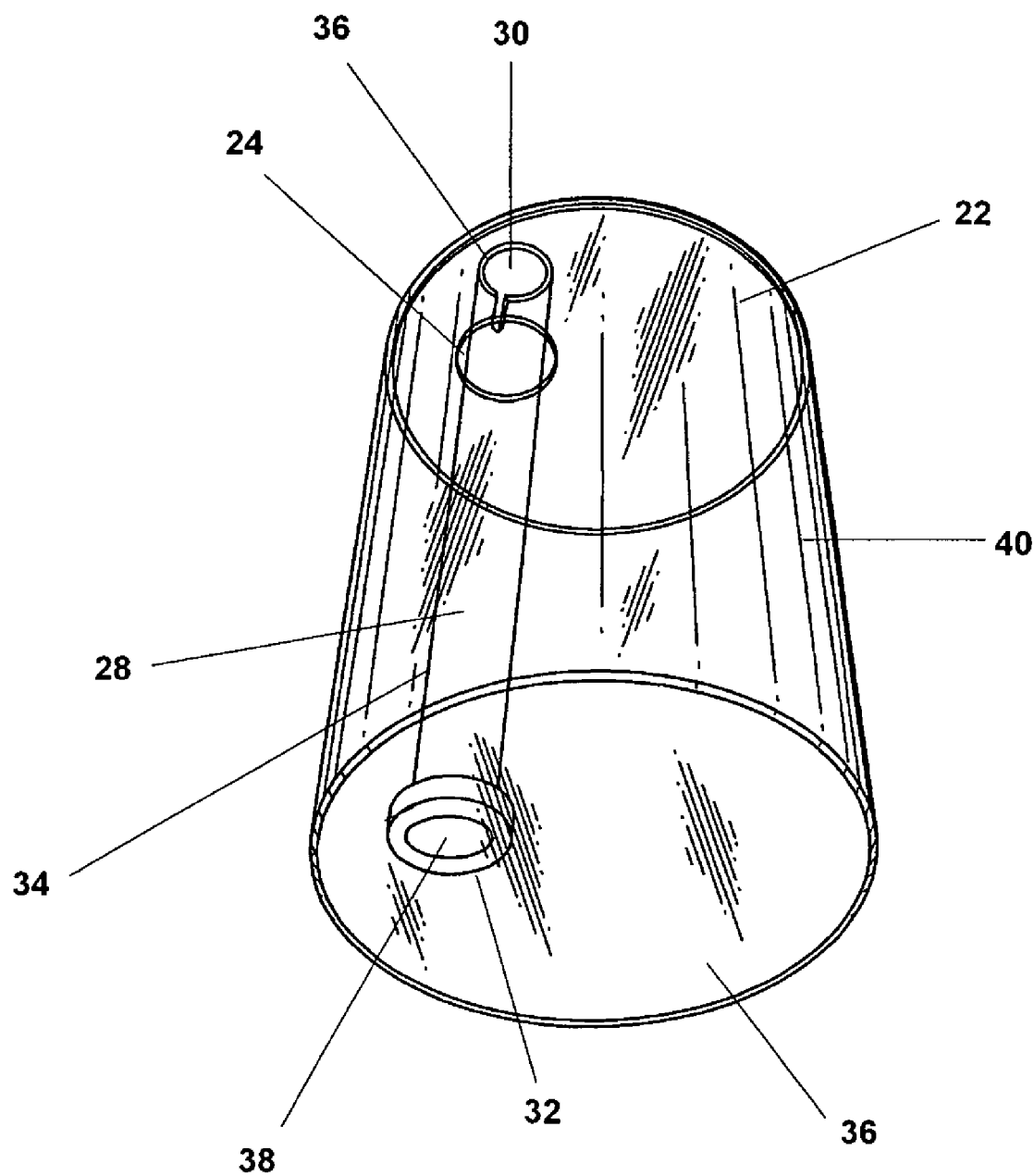
FIG. 3 illustrates a bottom view of one embodiment of the aquarium tank without the top base, bottom base, coral or light fixture. The aquarium tank comprises a hollow member within the interior of the tube that aligns with an opening in the bottom interior of the tank and aligns with an opening in the top of the tank. Electrical wires from an electrical device can run through the hollow member out the bottom of the tank out to an electrical outlet.

FIG. 3 illustrates a bottom view of one embodiment of the aquarium without the top base, bottom base, coral or light fixture. An optional, top cover (22) of the tank (40) is shown in the closed position. The cover optionally may have a rim or edge that fits snuggly to cover the tank. The top cover (22) may swivel around the hollow member in an open and closed position so that the tank can be filled with water (e.g., salt or fresh water) or sand, gravel, etc. The top cover (22) may have an opening (24) that allows the hollow member to pass therethrough. The hollow member (28) has upper opening (30) that is above the water level of the tank and an inner surface (36) that is capable of receiving an electrical wire. The outer surface (34) of the hollow member keeps water out of the inner surface (36) so that the electrical wires or power cords are not exposed to water. The electrical wires will run up or down the inner surface (36) of the hollow member and out the lower opening of the hollow member and out the bottom opening of tank bottom (38). In this way, the electrical wires can be hidden within the hollow member (28), if the hollow member is opaque.

The hollow member (28) runs within the interior of the tank, adjacent to the walls of the tank and can comprise a flange (32) that contacts the lower opening of the hollow member and the opening (38) in the bottom of the tank (36) to prevent water from leaking out the opening in the bottom of the tank. The flange can be bonded to the bottom of the tank and can be bonded to the hollow member.

In various embodiments, the hollow member within the interior of the tank aligns with an opening (38) in the bottom of the tank and aligns with an opening (24) at the top of the tank (22). Electrical wires to or from an electrical device can run through the hollow member out the bottom of the tank and out to an electrical outlet.

Figure 4:
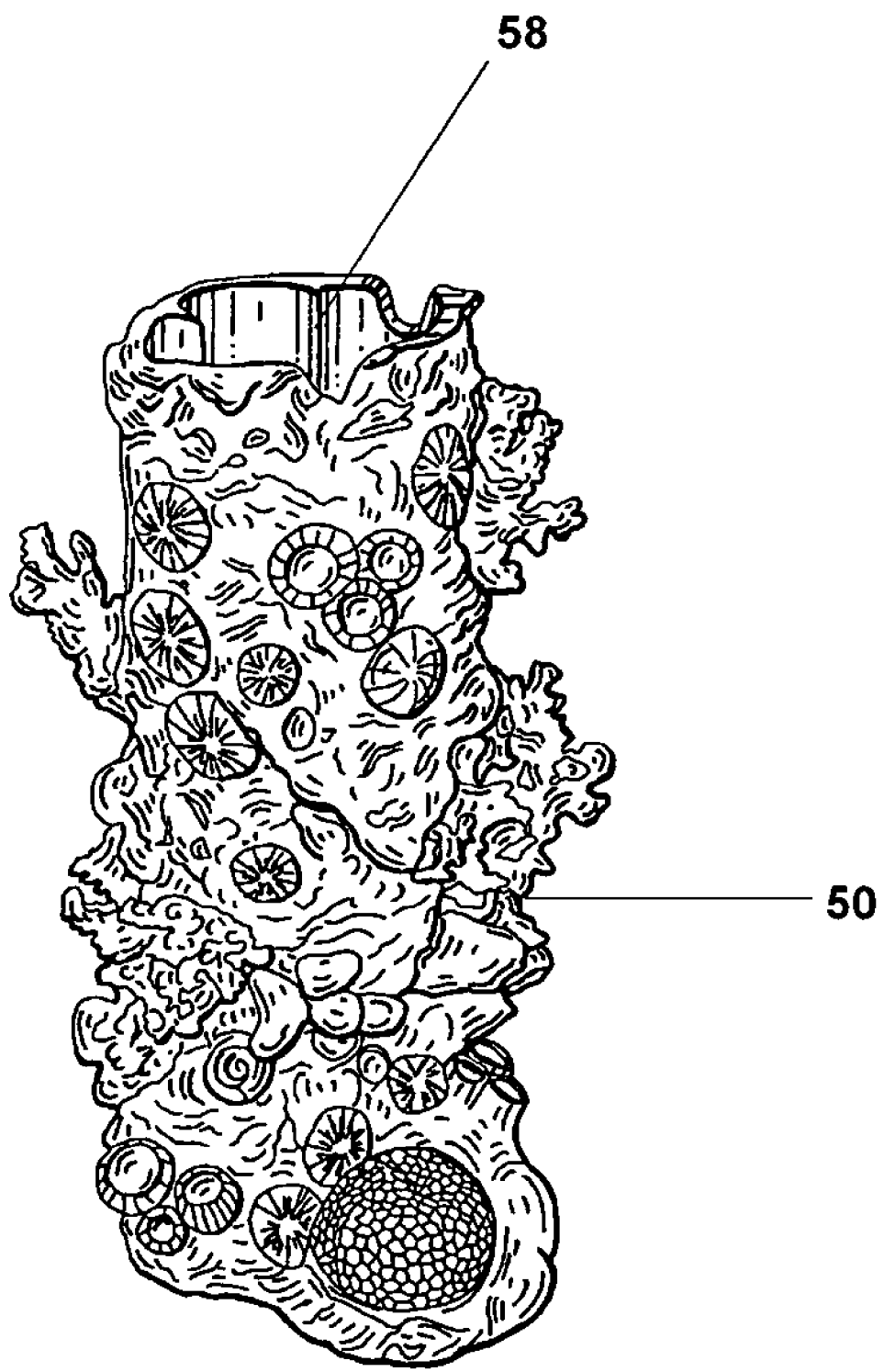
FIG. 4 illustrates a side view of one embodiment of a decorative structure (e.g., coral) that has a channel that can receive the hollow member (not shown) so that electrical wires from an electrical device are hidden from view.

FIG. 4 illustrates a side view of one embodiment of a decorative structure (e.g., coral, plant, ornament, etc.) (50) having a channel (58) that the hollow member (not shown) can sit so that electrical wires from an electrical device are hidden. The channel (58) is a sufficient size to allow placement of the hollow member within the channel and/or placement of an electrical device (e.g., a filter, heater, aerator, light, or automatic feeder, etc.) within the channel (58). Thus, the electrical device and portions of the hollow member are out of view. In various embodiments, the decorative structure can also be a tube and the hollow member is placed within the circumference of the decorative structure out of view.

The decorative structure has the electrical devices behind it, so fish or other animals are not in direct contact with the devices and thus cannot damage or move the devices. Thus, the decorative structure acts also to protect the electrical devices from the animals. The decorative structure can be porous to allow water through it or be non-porous.

In various embodiments, the decorative structure is below the water level in the tank and a shorter length than the hollow member so that water can flow in the channel and contact the filter, aerator, and/or heater to maintain the proper environment for the animals living in the aquarium.

In various embodiments, the decorative structure is tubular and the hollow member is also tubular and thus the hollow member sits inside the decorative structure so that there is a "tube within a tube" or "channel within a channel" assembly to conceal at least a portion of the outer surface of the hollow member. The hollow member being non-porous to water and protruding above the decorative structure and above the water level in the tank. While the decorative structure is porous or non-porous to water and shorter than the hollow member and the decorative structure is below the water level in the tank so that water can pass within its channel and contact the filter, aerator, and/or heater to maintain the proper environment for the animals living in the aquarium.

Figure 5:
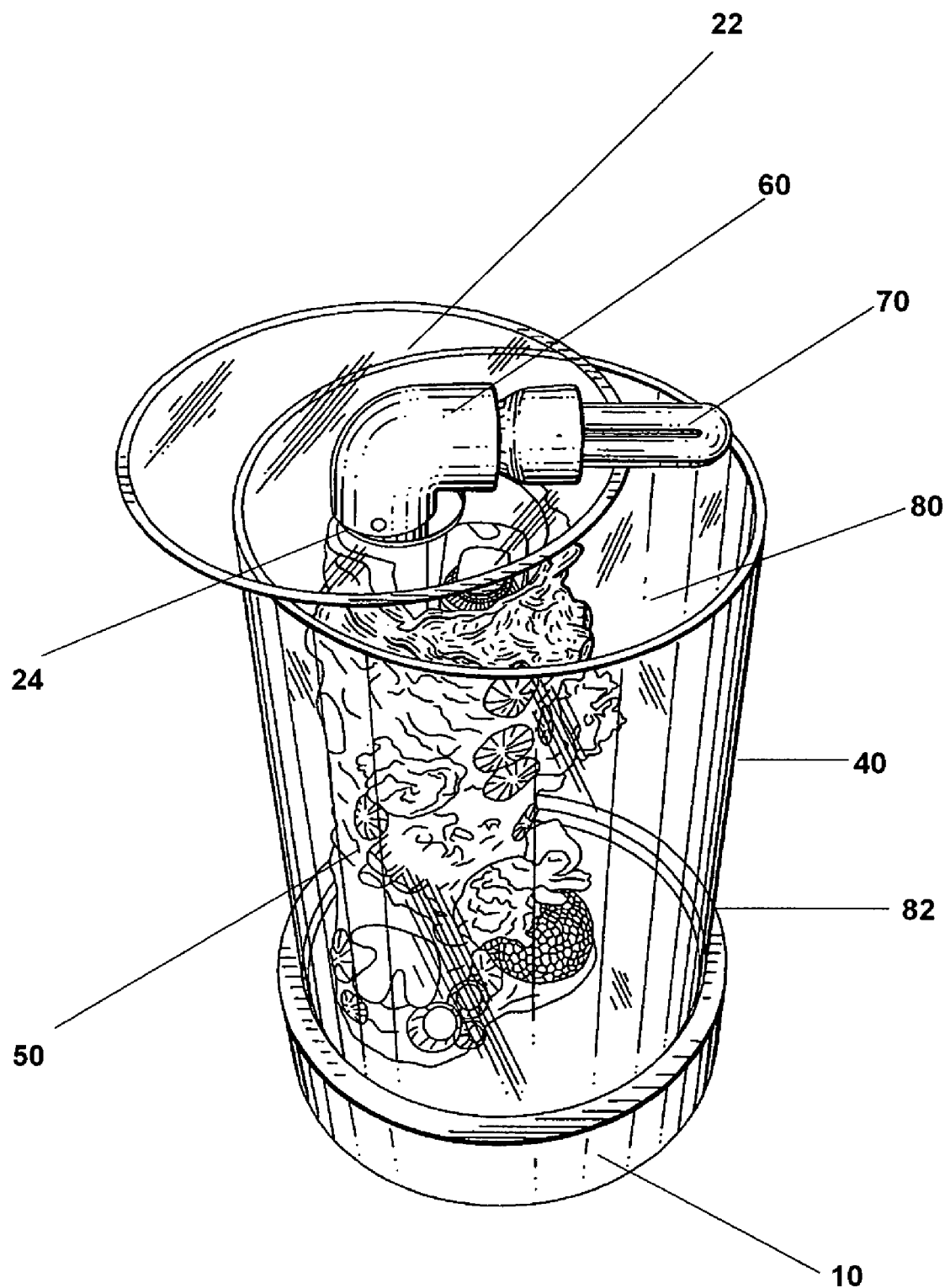
FIG. 5 illustrates a top view of one embodiment of the partially assembled aquarium without the top base but with top cover partially open. Aquarium light bulb and socket extends from the hollow member out of the top of the tank. The light bulb and socket is not visible when the top base is on the top of the tank.

FIG. 5 illustrates a top view of one embodiment of the partially assembled aquarium tank (40) without the top base and top cover (22) partially open. Aquarium light bulb (70) and socket (60) extends from the hollow member out of the top opening (24) of the tank. The light bulb and socket would not be visible if the top base was on the top of the tank. Decorative structure (50) is within the interior (80) of the tank and has a channel which the hollow member and electrical devices are hidden within it so they are not visible from tank exterior (82). Optional bottom base (10) fits snuggly around tank exterior (82) and has an opening to allow electrical wires to run out the bottom of the tank and out to an electrical outlet.

Figure 6:
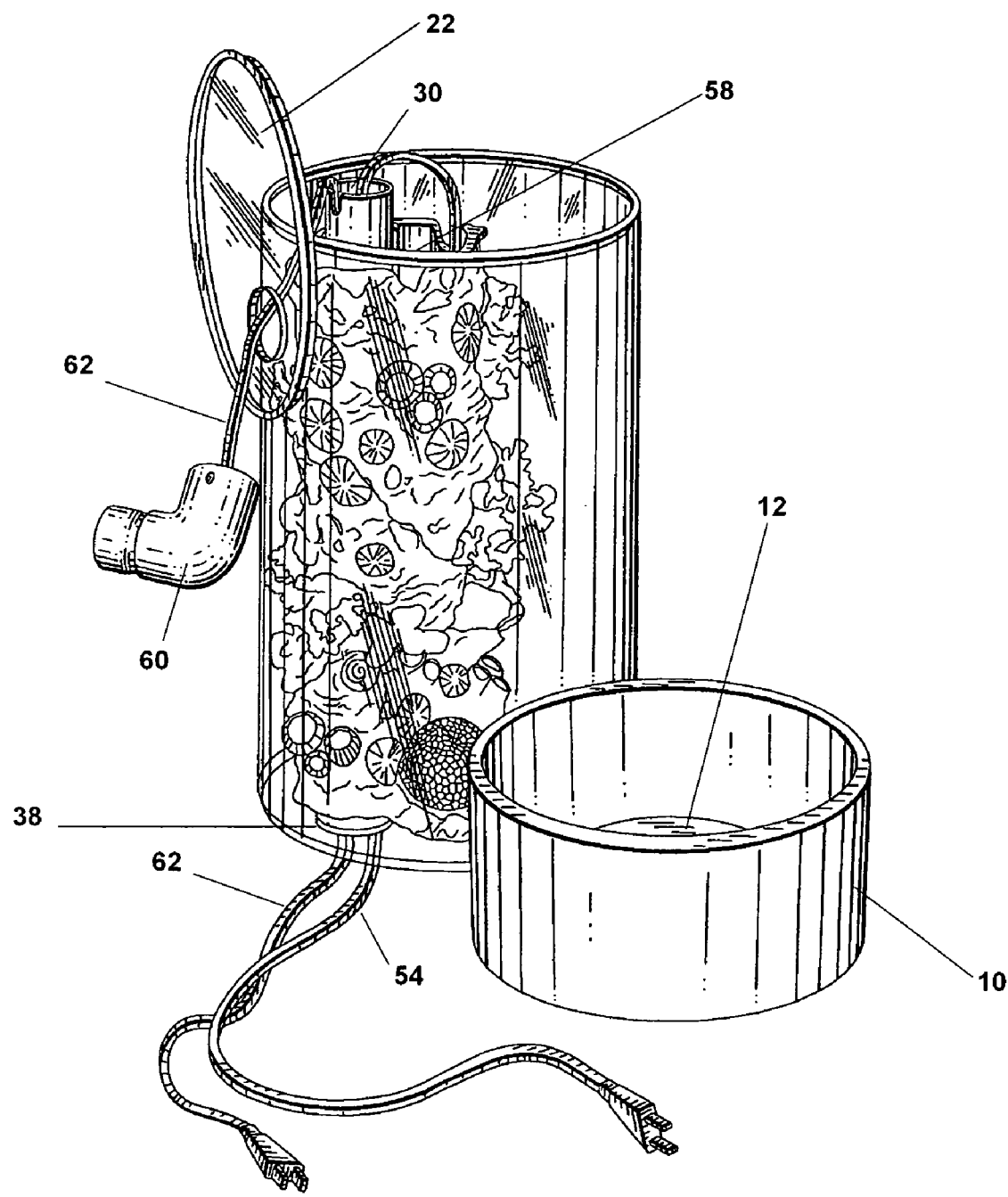
FIG. 6 illustrates a side view of one embodiment of the partially assembled aquarium without the top base. The aquarium comprises a hollow member within the interior of the tank that aligns with an opening in the bottom interior of the tank and aligns with an opening in the top of the tank. In this figure, the hollow member sits within a coral structure. Electrical wires from an electrical device, in this case a light, are run through the hollow member out the bottom of the tank. The electrical wires running in the interior of the tank are hidden from view.

FIG. 6 illustrates a side view of one embodiment of the partially assembled aquarium without the top and bottom bases on the tank. The top cover (22) of the tank is shown open. The tank cover (22) may have a rim that allows the top cover to fits snugly on the tank. Hollow member has upper opening (30) that is above the water level of the tank and an inner surface that is capable of receiving an electrical wire (62) from light socket (60). The electrical wires will run up or down the inner surface of the hollow member and out the lower opening of the hollow member and out the bottom opening (38) of tank bottom. In this figure, the hollow member is surrounded by a decorative structure (e.g., coral structure) that has a channel (58) in which the hollow member is disposed.

In FIG. 6, another electrical device (e.g., filter or heater) is hidden behind the decorative structure and electrical wire (54) from the device is run through the hollow member, along with the electrical wire from the light, out the bottom opening (38) of the tank. The electrical wires running in the interior of the tank are hidden from view. Lower base (10) is shown detached from the tank. The optional lower base (10) runs under a portion of the exterior of the tank and has an opening (12) so electrical wires running within the hollow member that pass through the opening in the bottom of the tank can also pass out this opening to an electrical outlet.

Figure 7:
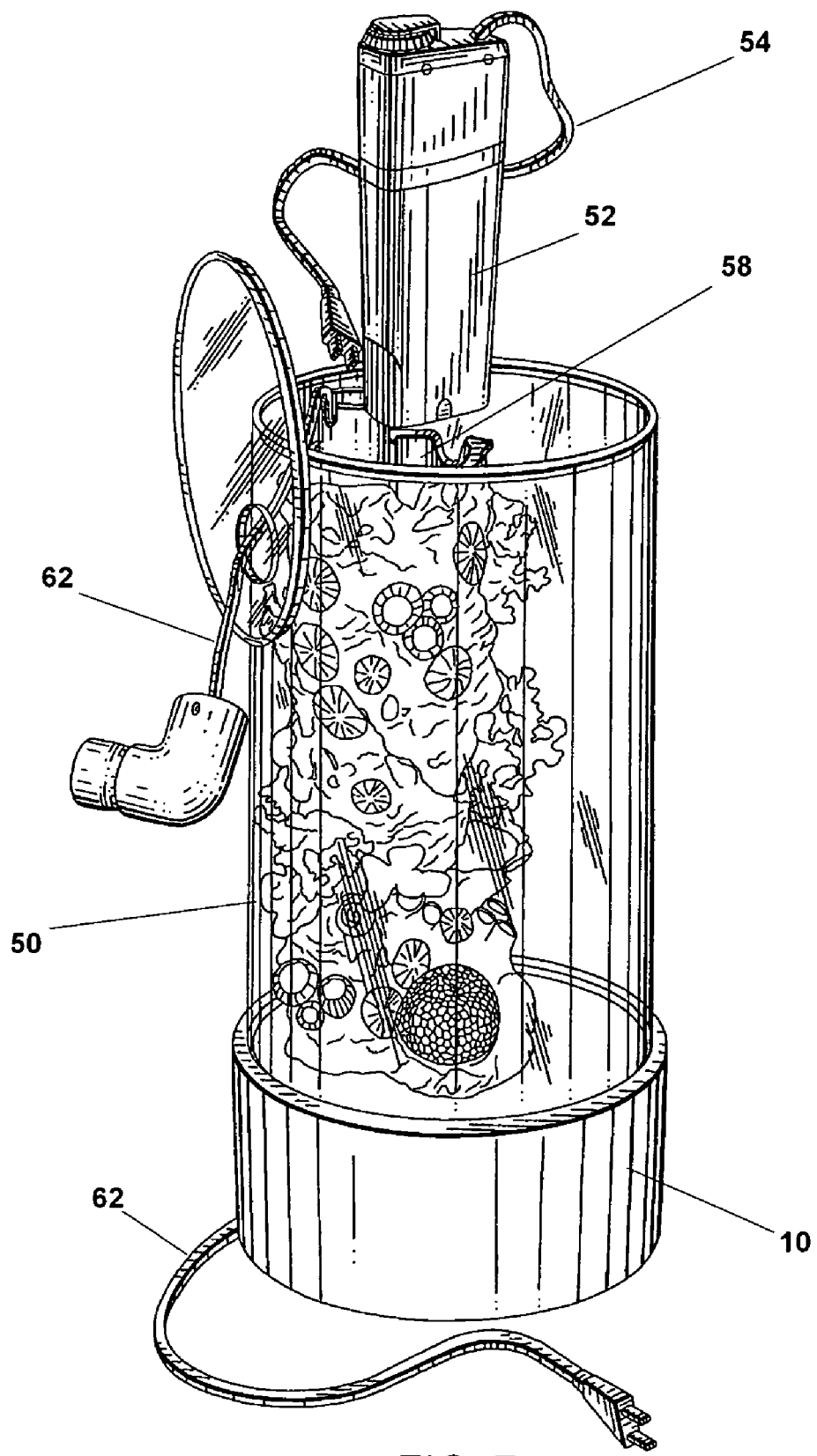
FIG. 7 illustrates a side view of one embodiment of the partially assembled aquarium without the top base, and the top cover of the aquarium open. The aquarium comprises a hollow member within the interior of the tank that aligns with an opening in the bottom interior of the tank (not shown) and aligns with an opening in the top of the tank. In this figure, an underwater filter is placed within a channel of the coral, electrical wires from the filter and light are ran through the hollow member out the bottom of the tank. The electrical wires are hidden from view in the inside of the tank by the coral.

FIG. 7 illustrates a side view of one embodiment of the partially assembled aquarium without the top base. In this figure, an underwater filter (52) is placed within a channel (58) of the decorative structure (50), electrical wire (54) from the filter or heater and electrical wire (62) from the light are run through the hollow member out the bottom of the tank. The electrical wires are hidden from view in the inside of the tank by the coral. The optional lower base (10) runs under a portion of the exterior of the tank and has an opening so electrical wires running within the hollow member that pass through the opening in the bottom of the tank can also pass out this opening to an electrical outlet.

Figure 8:
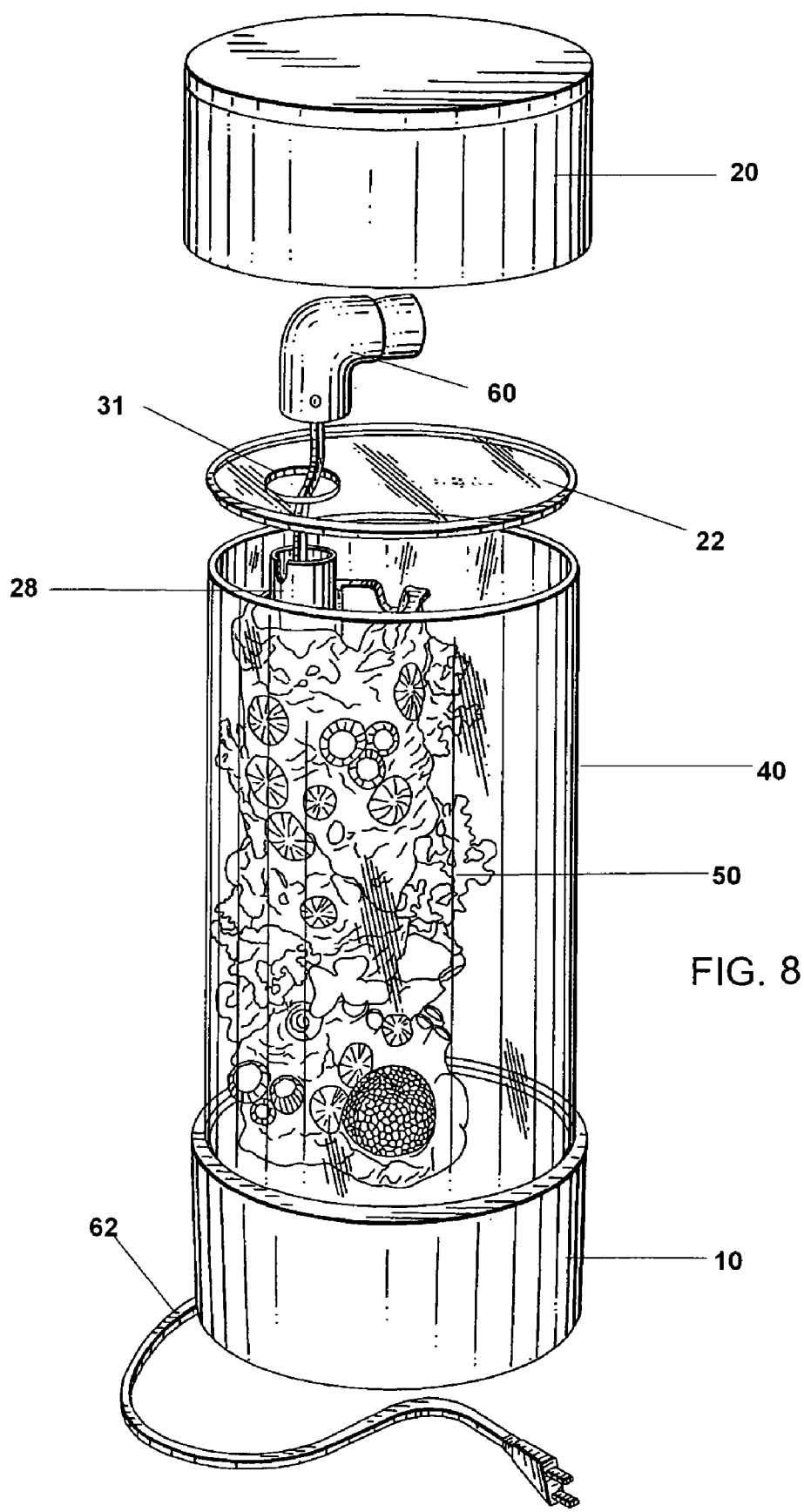
FIG. 8 illustrates a side view of one embodiment of the partially assembled aquarium with the top base that fits over the top cover and the light socket so that the light socket is hidden. The aquarium comprises a hollow member within the interior of the tube that aligns with an opening in the bottom interior of the tank (not shown) and aligns with an opening in the top of the tank. The hollow member sits in the decorative structure (e.g., coral). In this figure, the top cover can be placed over the light socket (which attaches to the upper opening of the hollow member), electrical wires from the light are run through the hollow member out the lower opening of the hollow member and out the bottom of the tank. The electrical wires are hidden from view in the inside of the tank by the coral.

FIG. 8 illustrates a side view and partially assembled aquarium tank (40) with the top base (20) that fits over the top cover (22) and the light socket (60) and covers the top cover (22), the upper portion of the hollow member (28) so that the light socket (60) is hidden. Top base (20) also runs over a portion of the exterior of the tank to hide the upper opening of the hollow member and further hide electrical wires running within the hollow member. The coral (50) hides the electrical wire (62) from the light socket (60) and allows the electrical wires to come out the bottom of base (10).

Figure 9:
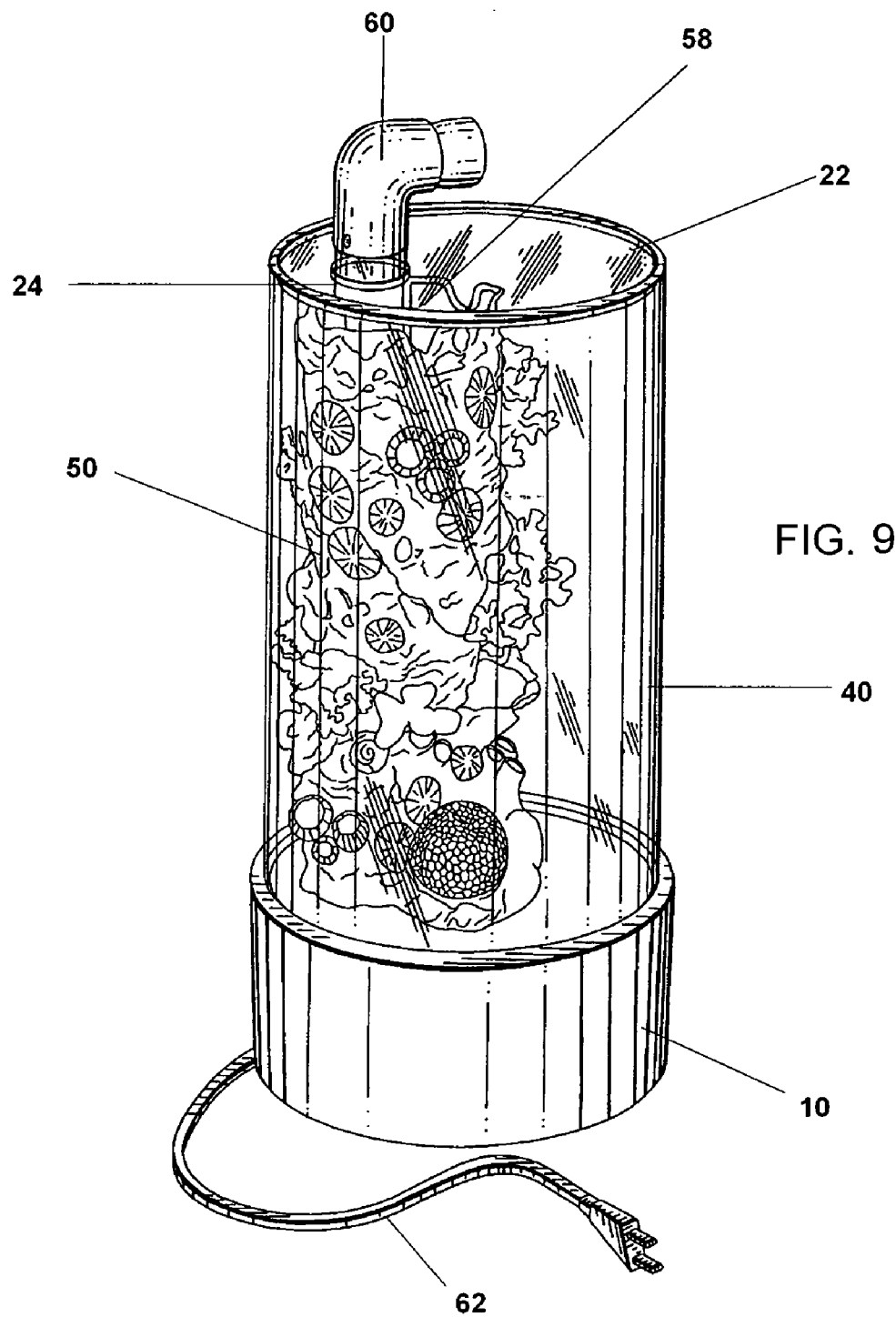
FIG. 9 illustrates a side view of one embodiment of the partially assembled aquarium without the top base so the light socket is visible. The aquarium comprises a hollow member within the interior of the tube that aligns with an opening in the bottom interior of the tank (not shown) and aligns with an opening in the top of the tank. A light socket is attached to the upper opening of the hollow member. The hollow member sits within coral. In this figure, electrical wires from the light are run through the hollow member out the lower opening of the hollow member and out the bottom of the tank. The electrical wires are hidden from view in the inside of the tank by the coral.
Figure 10:
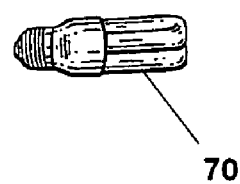
FIG. 10 illustrates one embodiment of the light bulb that can be attached to the light socket.

FIG. 9 illustrates a side view of a partially assembled aquarium tank (40) without the top base, but with top cover in the closed position and top cover opening (24) having light socket (60) running through the top cover opening (24). In this figure, an electrical wire (62) from the light socket (60) is run through the hollow member out the bottom of the tank. The electrical wire is hidden from view in the inside of the tank by the coral (50). The optional lower base (10) runs under a portion of the exterior of the tank and has an opening so electrical wires running within the hollow member that pass through the opening in the bottom of the tank can also pass out this opening to an electrical outlet. FIG. 10 shows a bulb (70) that can go in socket (60) to provide light.

It will be understood that the aquarium tank and parts can be any size, shape and color. The aquarium tank can be made of a clear or transparent material so as it can be easily viewed. For example, the tank may be plastic (e.g., acrylic), polyurethane, polyethylene, PVC, glass, or another plastic, or the like or combinations thereof. The tank may have algae or mildew resistant material for easy cleaning. Parts of the aquarium can be permanent or removable for easy cleaning.

The top and bottom bases, top cover, hollow member, and/or decorative structure, may be plastic (acrylic), polyurethane, polyethylene, PVC, glass, or another plastic, ceramic or the like or combinations thereof. The top and bottom bases, top cover, hollow member, each may have a decorative design to further make for a beautiful aquarium setting. The top and bottom bases, top cover, hollow member, and/or decorative structure may also have algae or mildew resistant material for easy cleaning. The top and bottom bases, top cover, hollow member, and/or decorative structure can be permanent or removable for easy cleaning.

In various embodiments, the hollow member and/or decorative structure can be extendible to any desired position or size, or alternatively they can be one size.

In one preferred embodiment, the aquarium comprises an underwater or submersible type filter, which is usually constituted by a container inside which there is filtering material, through which the water from the aquarium passes so that the filtering material retains the suspended dirt. Other filters can be used including external filters, conventional gravity, pressure or siphon-type filters.

In one preferred embodiment, the aquarium comprises an underwater or submersible type heater, which is adapted to modify the temperature of the water from that of the surrounding ambient air temperature. However, other conventional non-submersible external heaters can be used.

In one preferred embodiment, the aquarium comprises a light source, which is situated above the tank extending from the upper opening of the hollow member. The light source is shielded from view by the top base so that its light reflects downward into the tank in order to illuminate the fish or animal and provide, if necessary, the light necessary for photosynthesis of any submerged aquatic plants. The light source (s) generally comprise fluorescent lamps with associated power switch and transformer, incandescent lamp(s), or miscellaneous sources such as light emitting diodes (LEDs). These light sources are adequate to provide illumination for simple viewing or can be modified to furnish the proper color rendition to provide a lifelike appearance of fish and vegetation or the means by which the viewing experience can be enhanced by, for instance, varying the color spectrum or hue of the light source. Additionally, the light source can be mounted, shielded, or otherwise constructed in a manner that prevents water from being splashed on it in order to prevent the possibility of an electrical short circuit or damage to the animal.

The aquarium may optionally contain other parts known in the art such as aeration systems, water conditioners, feeders, variety of gravel or sandy bottom material, vegetation, rocks, and other decorative items.

The aquarium can be made by creating an opening in a bottom of the aquarium tank, positioning a hollow member through the opening or bonding the hollow member to the opening at the bottom of the tank so as to provide a water-tight seal preventing water from leaking out the opening. The hollow member can have flanges or rims that can be attached to the interior of the tank and, if necessary to the top. Likewise, top and bottom bases, optionally can be attached to the tank. The hollow member can be permanently or removably attached.

It will be apparent to those skilled in the art that various modifications and variations can be made to various embodiments described herein without departing from the spirit or scope of the teachings herein. Thus, it is intended that various embodiments cover other modifications and variations of various embodiments within the scope of the present teachings.

What is claimed is:

1. An aquarium, comprising: a tank capable of holding water, the tank having an interior and an exterior, and a bottom, the bottom having an opening within the interior of the tank, a hollow member disposed within at least the interior of the tank and having an upper opening, a lower opening, an inner surface and an outer surface, the lower opening capable of aligning around or with the opening in the bottom of the tank so that water is prevented from leaking out the opening in the bottom of the tank, the outer surface of the hollow member capable of preventing water flow into the inner surface of the hollow member, and the inner surface of the hollow member capable of receiving one or more electrical wires to or from the upper and lower openings of the hollow member, wherein the tank further comprises a top and the hollow member runs out the top of the tank.

2. An aquarium according to claim 1, wherein the hollow member is a tube, which: i) comprises a flange that contacts the lower opening of the hollow member and the bottom of the tank to prevent water from leaking out the opening in the bottom of the tank or ii) passes through the opening to coapt the opening in the bottom of the tank to prevent water from leaking out the opening in the bottom of the tank.

3. An aquarium according to claim 1, wherein the hollow member is opaque and conceals one or more electrical wires that run through the inner surface of the hollow member within the interior of the tank.

4. An aquarium according to claim 1, wherein the upper opening of the hollow member receives electrical wires from at least one of a filter, heater, aerator, light, or automatic feeder and allows the electrical wires to run out the bottom opening of the tank to an electrical outlet.

5. An aquarium according to claim 1, wherein the hollow member receives electrical wires from at least one of a filter, heater, aerator, light, or automatic feeder.

6. An aquarium according to claim 1, wherein the hollow member is bonded to the bottom of the tank around the opening of the bottom of the tank to provide a water-tight seal to prevent water from leaking out of the bottom of the tank.

7. An aquarium according to claim 1, wherein the hollow member has an upper portion that runs out the top of the tank, the upper portion comprising a light or light socket in contact with an electrical wire running through the inner surface of the hollow member and out the bottom opening of the tank.

8. An aquarium according to claim 7, wherein the tank has a cover on the top and a top base that surrounds the cover and covers a light or light socket and a bottom base that surrounds the bottom of the tank.

9. An aquarium according to claim 1, wherein the interior of the tank has a decorative structure that conceals the outer surface of the hollow member.

10. An aquarium according to claim 9, wherein the decorative structure is coral.

11. An aquarium according to claim 9, wherein the decorative structure is positioned at a distance from the hollow member to conceal the outer surface of the hollow member.

12. An aquarium according to claim 9, wherein an underwater electrical device is disposed inside the interior of the tank between the hollow member and the decorative structure so as to conceal the electrical device behind the decorative structure.

13. A method of making an aquarium of claim 1, comprising:
    making an opening in a bottom of the aquarium, positioning a hollow member through the opening or bonding the hollow member to the opening at the bottom of the tank so as to provide a water tight seal preventing water from leaking out the opening, wherein the hollow member is capable of receiving electrical wires to and from an electrical device, and the tank further comprises a top and the hollow member is positioned to run out the top of the tank.

14. An aquarium, comprising: a tank capable of holding water, the tank having an interior and an exterior, and a bottom, the bottom having an opening within the interior of the tank, a hollow member disposed within at least the interior of the tank and having an upper opening above the water level of the tank, a lower opening, an inner surface and an outer surface, the lower opening capable of aligning with the opening in the bottom of the tank so that water is prevented from leaking out the opening in the bottom of the tank, the outer surface of the hollow member capable of preventing water flow into the inner surface of the hollow member, and the inner surface of the hollow member capable of receiving one or more electrical wires to or from the upper and lower openings of the hollow member, wherein the tank further comprises a top and the hollow member runs out the top of the tank.

15. An aquarium according to claim 14, wherein the hollow member is a tube, which: i) comprises a flange that contacts the lower opening of the hollow member and the bottom of the tank to prevent water from leaking out the opening in the bottom of the tank or ii) passes through the opening to coapt the opening in the bottom of the tank to prevent water from leaking out the opening in the bottom of the tank.

16. An aquarium according to claim 14, wherein the hollow member is opaque and conceals one or more electrical wires that run through the inner surface of the hollow member within the interior of the tank.

17. An aquarium according to claim 14, wherein the hollow member receives electrical wires from at least one of a filter, heater, aerator, light, or automatic feeder and allows the electrical wires to run out the bottom opening of the tank to an electrical outlet.

18. An aquarium according to claim 14, wherein the hollow member has an upper portion that runs out the top of the tank, the upper portion comprising a light or light socket in contact with an electrical cord running through the inner surface of the hollow member and out the bottom opening of the tank.

19. An aquarium according to claim 18, wherein the tank comprises a top base that covers the light or light socket and the hollow member and the tank comprises a bottom base that surrounds the bottom of the tank.

* * * * *